June 4, 1929.  E. L. OLIVER  1,715,944
ELASTIC SEAL
Filed July 12, 1921
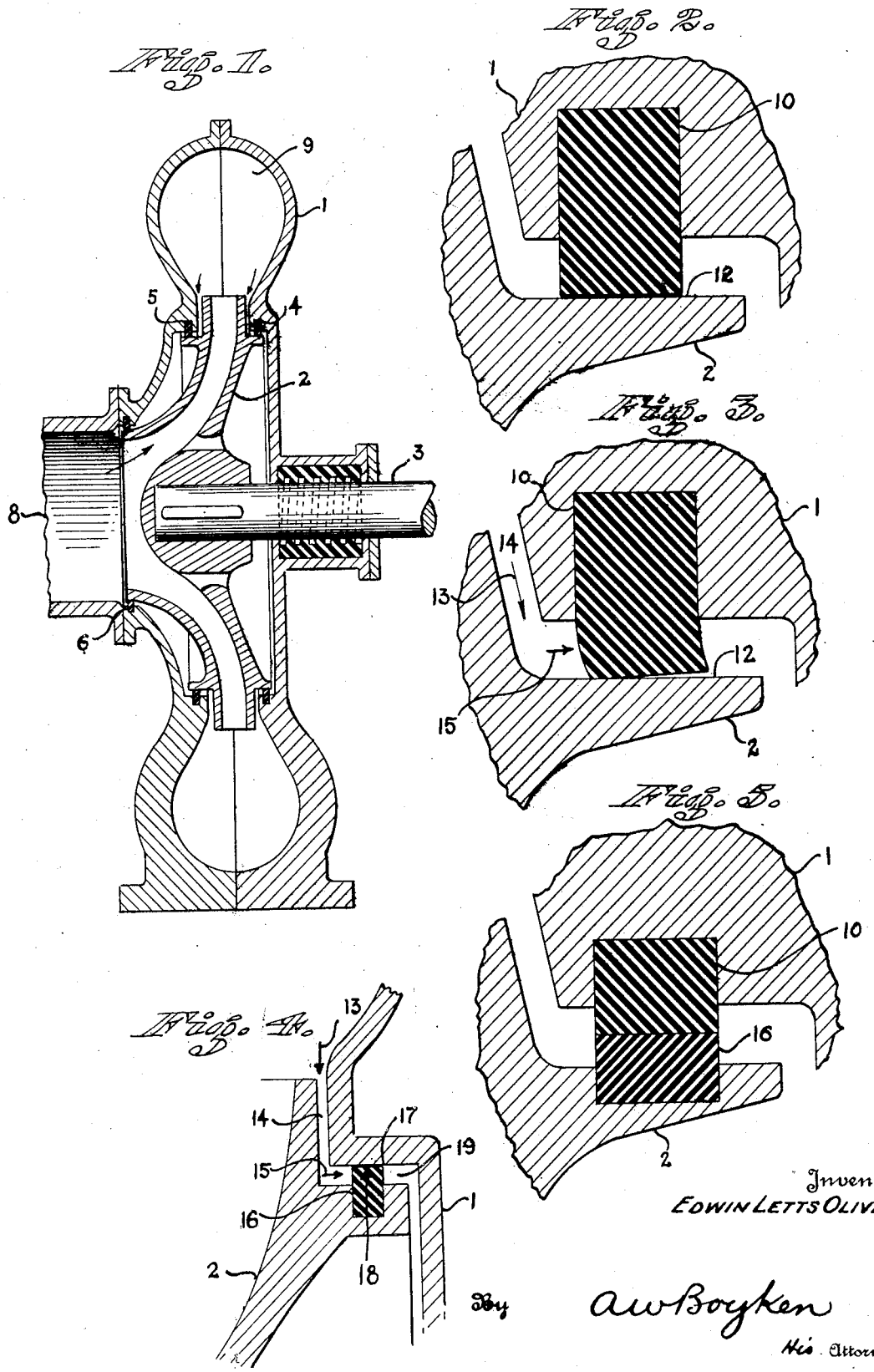
Inventor
EDWIN LETTS OLIVER
By A W Boyken
His Attorneys.

Patented June 4, 1929.

1,715,944

UNITED STATES PATENT OFFICE.

EDWIN LETTS OLIVER, OF PIEDMONT, CALIFORNIA, ASSIGNOR TO OLIVER-SHERWOOD CO., A CORPORATION OF CALIFORNIA.

ELASTIC SEAL.

Application filed July 12, 1921. Serial No. 484,093.

My invention is directed to the sealing of a running joint between two relatively movable surfaces, which sealing I accomplish by introducing a rubber or other elastic member between the said surfaces and fixed to one of the surfaces such that the other surface moves with respect to and in contact or close proximity with the rubber member.

My elastic seal is particularly adapted to sealing the running joints in hydraulic apparatus, turbines, pumps and the like and is especially effective in sealing the running joints of sand pumps, slime, and chemical pumps and other apparatus of like nature.

By referring to the accompanying drawings my invention will be made clear.

Figure 1 is a longitudinal cross section of a portion of a turbine either for developing power or pumping.

Figure 2 is an enlarged detail showing my elastic ring in a groove on the stationary member.

Figure 3 is an enlarged detail showing the ring of Figure 2 deformed when pressure occurs in the direction of the arrow.

Figure 4 shows the elastic ring fixed to the movable member.

Figure 5 shows two elastic rings, one fixed in a groove in the movable member and the other in a groove in the stationary member.

Throughout the figures similar numerals refer to identical parts.

At 1 is shown a casing having a runner 2 rotatably mounted on the shaft 3, while at 4, 5, 6, sealing rings are introduced. In the case of a centrifugal pump the water enters at 8 and is discharged from the runner into the periphery of the casing at 9, whereas in the case of turbine water wheel for developing power the water approaches the runner from the casing 9, thence passing through the runner is discharged at 8.

These sealing rings have heretofore been made of metal and when turned out of the shop a relatively close running joint is established between the rotating element and the stationary element by conventional packing means. However, in my invention the rings are made of rubber or other elastic material and are preferably dovetailed or otherwise rigidly engaged in the holding member.

At 10 in Fig. 2 is shown one of my elastic sealing rings engaged in the stationary casing 1. There being no pressure in the casing the ring 10 and the running surface 12 are very close together or even touching, but no pressure is exerted between the two; that is, there is left a running joint between the ring 10 and the surface 12 as shown in Fig. 2.

When pressure is introduced into the casing, whether it be due to centrifugal action of water flowing through the runner from 8 to 9 or whether it be pressure water introduced at 9 to drive the runner as it flows towards 8, the said pressure may be represented by the arrow 13, which being transmitted through the joint 14 exerts a side pressure as indicated at 15, against my elastic ring 10. This will now be deformed by the said pressure as shown in Fig. 3 and this deformation will cause a pressure between the ring and the surface 12, entirely closing the running joint and maintaining only a lubricating film of water forced therethrough by the pressure 15. The elasticity of the ring 10 enables the joint to be maintained in a sealed condition even though irregularities in the surface itself or in the circle of rotation occur at 12.

Referring particularly to Figure 4 wherein my ring 16 is shown as fixed to the rotating member 2, it will be seen that in such construction the ring will be in close proximity or lightly touching the inner surface of the casing 1 at 17. Pressure enters the casing, as shown by the arrow 13, Figure 4, and is transmitted through the joint 14 and against the side of the elastic seal 16 as shown by the arrow 15. The sealing ring tends to be deformed by this side pressure substantially the same as in Figure 3, but in this case we have the centrifugal force 18 due to the rotation of the runner effecting an additional pressure closure combining to eliminate the passageway 19 except for the lubricating film previously mentioned. The deformation of the ring in Figure 4 will be that due to the result of the forces 15 and 18, and will be substantially the same as in Figure 3.

The use of rubber or other elastic material for sealing rings is not only adaptable to centrifugal pumps, but may be advantageously used in other rotating machinery, such as rotary compressors. The ring may be spirally or otherwise grooved for lubrication, the lubricant being either the fluid handled by the pump or may be supplied from an exterior source. Making the sealing ring of elastic material enables it to conform to any contour that might be used for a pump casing or impeller. Furthermore, an extremely low coefficient of friction exists between surfaces moving in contact with rubber and in my invention, the wetting of the surface of the rubber results in a perfect seal between the running surfaces as well as a low coefficient of friction.

It will be understood that the rubber or other elastic ring may be fixed to either the rotating or the stationary member, or both as shown in Figure 5, depending upon existing conditions. However, it is not necessary for the rubber to be in contact with the opposite member, as in some cases a substantial seal may be effected by close proximity, and I desire to be understood as claiming all such variations.

I claim:

1. In the running joint of a liquid pump or the like the combination of concentrically supported members with adjacent overlying circular surfaces in relative motion when the machine is in operation, a soft rubber ring on one of said members having a freely projecting margin with the annular edge thereof presented to the circular surface of the adjacent member with said annular edge free for lateral deflection, means supporting the opposite annular edge of the ring, and one side only of said margin being exposed to the effective liquid pressure of the pump to cause lateral deflection of said margin for more effectively sealing the joint.

2. In the running joint of a pump or turbine the combination of concentric members in relative rotation when the machine is in operation, a soft rubber ring on one of the members with its annular edge presented close to but spaced from the other member when said ring is not deflected laterally.

3. In the running joint of a fluid pump or the like, the combination of concentric members in relative rotation when the machine is in operation, and a soft rubber ring on one of said members having a laterally-flexible portion axially free of the other member in both directions and normally presenting an annular edge close to but not in contact with the other member, said ring when acted on by fluid pressure from the pump being deformed to contact with said other member.

EDWIN LETTS OLIVER.